Patented Mar. 20, 1934

1,951,664

UNITED STATES PATENT OFFICE 1,951,664

COLLOIDAL SUSPENSIONS AND THE PROCESS OF MAKING SAME

Edwin Herbert Land, Wellesley Farms, Mass.

No Drawing. Application December 3, 1932, Serial No. 645,590

24 Claims. (Cl. 252—6)

This invention relates to new and improved colloidal suspensions and to the process of making the same. The invention has for its object generally an improved colloidal suspension comprising a dispersed colloid suspended in a protecting, dispersing material, which in turn is dissolved or colloidally suspended in a non-solvent of the first mentioned material.

The invention has for its object generally the manufacture of colloids of the periodides of the sulphates of quinine and related alkaloids, and more specifically the manufacture of a colloidal suspension of said products in a suitable protecting medium. More specifically, an object of the invention is to provide colloidal herapathite.

A further object of the invention is the production of colloidal herapathite dispersed throughout a suitable protecting medium.

A further object is to provide an improved process for forming colloids of the periodides of the sulphates of quinine and related alkaloids.

A more specific object is to provide a process for forming colloidal herapathite, and further for dispersing said colloidal material in a suitable protecting medium.

Other objects of the invention will in part be obvious and will in part appear hereinafter.

The invention accordingly comprises the several steps and the relation and order of one or more of such steps with relation to each of the others, and the product possessing the features, properties, and the relation of constituents which are exemplified in the following detailed disclosure, and the scope of the application of which will be indicated in the claims.

This application is a continuation in part of my copending application, Serial No. 434,833, filed March 10, 1930.

Heretofore, suspensions of herapathite have been produced in which the suspended particles were small, but yet clearly visible under an ordinary microscope. No suspension of truly colloidal particles of herapathite and/or the periodides of the sulphates of quinine and related alkaloids has been produced, despite repeated efforts. It appeared that such truly colloidal particles could not be produced at all, and that even the microscopic particles within the art could not be produced satisfactorily from the bisulphate of quinine and/or related alkaloids. It appeared furthermore that suspensions of the microscopic particles heretofore produced could not be readily secured in nitrocellulose. In the preferred embodiment of this invention the colloidal particles of the periodide of sulphate of quinine (herapathite) as well as colloidal particles of the periodides of the sulphates of related alkaloids are produced from the bisulphate of quinine and/or its related alkaloids, and are dispersed and suspended in protective media comprising nitrocellulose.

A suitable process for the manufacture of colloidal herapathite is as follows:

Dissolve 1.5 grams of quinine bisulphate in 50 c. c. of methyl alcohol. Bring the solution to a boil and stir preferably with an iron stirring rod. Remove the heat from the solution and add immediately 0.525 grams of iodine as a 20% solution in alcohol. Continue stirring until a gel forms and until the mass has cooled. The stirring precipitates the periodide of quinine sulphate (herapathite) as a jelly. This jelly comprises colloidal herapathite, probably in the form of needle-like or fibre-like crystals suspended in methyl alcohol. For some purposes, where a more highly dispersed colloid is desirable, or where a permanent colloidal crystalline structure is desired, the jelly-like suspension may be dispersed in a suitable protective suspending medium.

Such a suitable medium may comprise a solution or suspension of nitrocellulose in a complete non-solvent of the colloidal herapathite.

A suitable suspending medium of the character described may comprise a solution of nitrated cotton in as little solvent as will dissolve it. The highly soluble cottons, such as one-half second or one-fourth second cotton are preferable. A suitable solvent for the cotton is amyl-acetate, butyl-acetate, or ethyl-acetate, or mixtures thereof. Methyl-acetate should be avoided with herapathite as the suspended colloid.

Before the nitrated cotton is dissolved in the acetate, it is desirable that the cotton be dried, free from water and free from alcohol. The nitrocellulose solution is highly adhesive, a preferred quality, and when the colloidal herapathite is added thereto and stirred therein, the herapathite particles are readily dispersed throughout the nitrocellulose solution and remain suspended therein and protected thereby. The fluidity of the suspension may be controlled by the addition thereto or elimination therefrom of the solvent, so that an extremely fluid or a hardened and set suspension may be secured. In the solid form the colloidal particles of herapathite are suspended in the nitrocellulose. In the extremely fluid form the colloidal particles may more properly be said to be suspended in the solvent and protected by the nitrocellulose.

Throughout the specification and claims the reference to colloidal particles is intended to imply particles of such size that they will meet such standard colloid tests as, (a) that when suspended in a protective medium such as nitrocellulose and a suitable solvent for the protective medium, such as ethyl acetate or any other non-solvent of the colloidal particles, the particles will remain indefinitely in suspension irrespective of the amount of solvent employed, and (b) the particles in suspension will pass through quantitative filter paper.

It will be understood that where the suspension is to be subjected to stress, such as flow or stretch, to orient the colloidal particles therein, those particles should be of a shape susceptible to the effect of the stress employed, as for example, needle-shaped or fibre-shaped.

It will be understood further that other cellulosic and/or cellulose materials may be used as the protective dispersing medium for the colloid when dissolved in suitable solvents, i. e., solvents which are non-solvents for the colloid. For example, cellulose acetate, if dissolved in a suitable solvent, may form the suspending medium for the colloidal particles.

While the cellulosic materials have been spoken of as dissolved in a solvent to form the suspending medium, it is to be understood that the true condition may be more that of a colloidal solution of the cellulosic materials in the so-called solvent than a true solution. It should be further understood that while herapathite and the other related materials forming the dispersed colloid have been referred to as periodides of the sulphates of quinine and related alkaloids, there may be some doubt as to the actual structure of the materials in question, particularly since the structure of quinine is not definitely known. Jörgensen gives the formula for herapathite as

$$4(C_{20}H_{24}N_2O_2) \cdot 3H_2SO_4 \cdot 2HI \cdot I_4H_2O.$$

This formula is representative of the class of materials to which the invention applies.

It is to be understood further that the quantities and proportions given above in connection with the description of the method of preparing the colloidal herapathite may be varied and should be varied for certain purposes. For example, where the proportions are kept constant save for the addition thereto of an increased quantity of methyl alcohol, the colloidal jelly produced is a looser, less rigid jelly, and may be readily dispersed in a less viscous suspending medium than that produced by the proportions therefor given above.

It is obvious that the concentration of the colloid in the viscous medium may be varied at will from a degree at which the colloidal particles commence to grow, to any desired dilution.

While the suspending medium has been described as comprising cellulose or cellulosic materials, it is to be understood that other suitable media may be employed, as for example, certain gums, such as Canada balsam or linseed oil jelly. In fact, any material which disperses without dissolving or otherwise destroying the colloid may be employed.

It is obvious that suitable plasticizing agents, such as dibutyl phthalate or camphor may be added to the nitrocellulose suspension if a plastic solid is desired.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all the generic and specific features of the invention herein described, and all statments of the scope of the invention which, as a matter of language, might be said to fall therebetween.

Having described my invention, what I claim as new and desire to secure by Letters Patent is:

1. A colloidal suspension of a periodide of a sulphate of an alkaloid of the related group comprising quinine, quinidine, cinchonine and cinchonidine in a dispersion medium.

2. A suspension of colloidal herapathite in a dispersion medium.

3. A colloidal suspension of herapathite in an acetate.

4. A dispersion of colloidal herapathite in nitrocellulose.

5. A dispersion of colloidal herapathite in a solution of a cellulosic material in an acetate.

6. A dispersion of colloidal herapathite in a solution of nitrocellulose in an acetate.

7. As a new article of manufacture, colloidal herapathite dispersed throughout a medium comprising a protective ingredient for the herapathite dissolved in a non-solvent for the herapathite.

8. As a new article of manufacture, colloidal particles of herapathite dispersed throughout a medium comprising nitrocellulose and a non-solvent for herapathite.

9. As a new article of manufacture, a colloidal suspension of herapathite in Canada balsam.

10. As a new article of manufacture, a colloidal suspension of herapathite in linseed-oil jelly.

11. As a new article of manufacture, a suspension of colloidal herapathite in methyl alcohol.

12. As a new article of manufacture, a suspension of asymmetric needle-like colloidal particles of herapathite in a dispersion medium.

13. As a new article of manufacture, a set suspension of colloidal particles of herapathite in a suspending medium, comprising nitrocellulose.

14. In the process of manufacturing colloidal herapathite, the steps which comprise forming a solution of quinine bisulphate in an alcohol, adding thereto a solution of iodine, and stirring until a gel forms.

15. The process which comprises adding to a solution of quinine bisulphate in an alcohol, a solution of iodine in alcohol in the proportions approximately of 3 parts of quinine bisulphate to 1 part of iodine, and stirring.

16. In the process of manufacturing a dispersed suspension of colloidal herapathite, the step which comprises distributing the colloidal herapathite throughout a medium comprising cellulosic material and a non-solvent of herapathite.

17. In the process of manufacturing a dispersed suspension of colloidal herapathite, the step which comprises distributing the colloidal herapathite throughout a medium comprising nitrocellulose and an acetate non-solvent of herapathite.

18. The process of producing a dispersed colloidal suspension of herapathite, which comprises preparing a colloidal suspension of herapathite in methyl alcohol, preparing a solution of nitrocellulose in an acetate non-solvent of herapathite, incorporating the colloidal herapathite into the nitrocellulose solution, and stirring.

19. In the process of manufacturing colloidal suspensions of the periodides of the sulphates of the related group of alkaloids, comprising quinine, quinidine, cinchonine and cinchonidine, the step which comprises forming a solution of the bisulphate of the alkaloid and iodine.

20. As a new article of manufacture, a suspension of colloidal herapathite in alcohol.

21. The process of producing a dispersed colloidal suspension of herapathite, which comprises preparing a colloidal suspension of herapathite in alcohol, preparing a solution of nitrocellulose in a non-solvent of herapathite, incorporating the colloidal herapathite with the nitrocellulose solution and stirring.

22. The process which comprises preparing a colloidal suspension of a periodide of a sulphate of the related group of alkaloids comprising quinine, quinidine, cinchonine and cinchonidine in a dispersion medium, preparing a solution of cellulosic material in a non-solvent of said colloid, incorporating the colloid into the cellulosic solution, and stirring.

23. In a process of the character described, the steps which comprise forming a solution of a bisulphate of the related group of alkaloids comprising quinine, quinidine, cinchonine and cinchonidine in an alcohol, adding thereto a solution of iodine, and stirring until a gel forms.

24. As a new article of manufacture, a colloidal suspension of a periodide of a sulphate of an alkaloid of the related group comprising quinine, quinidine, cinchonine and cinchonidine dispersed throughout a medium comprising a protective ingredient for the colloid dissolved in a non-solvent for the colloid.

EDWIN HERBERT LAND.